(12) United States Patent
Hara et al.

(10) Patent No.: US 12,300,824 B2
(45) Date of Patent: May 13, 2025

(54) CELL, CELL STACK DEVICE, MODULE, AND MODULE HOUSING DEVICE

(71) Applicant: KYOCERA Corporation, Kyoto (JP)

(72) Inventors: Akihiro Hara, Kirishima (JP); Yuuichi Hori, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/471,603

(22) PCT Filed: Dec. 19, 2017

(86) PCT No.: PCT/JP2017/045517
§ 371 (c)(1),
(2) Date: Jun. 20, 2019

(87) PCT Pub. No.: WO2018/117098
PCT Pub. Date: Jun. 28, 2018

(65) Prior Publication Data
US 2020/0099062 A1 Mar. 26, 2020

(30) Foreign Application Priority Data
Dec. 20, 2016 (JP) ................................. 2016-246698

(51) Int. Cl.
*H01M 4/90* (2006.01)
*C04B 35/486* (2006.01)
(Continued)

(52) U.S. Cl.
CPC ......... *H01M 4/9025* (2013.01); *H01M 8/249* (2013.01)

(58) Field of Classification Search
CPC ............. H01M 8/0217; H01M 8/0204; H01M 8/0228; H01M 8/0297; H01M 8/1213;
(Continued)

(56) References Cited

U.S. PATENT DOCUMENTS 5,417,831 A * 5/1995 Koch .................. C25B 9/00
204/283
2004/0137297 A1* 7/2004 Matsuoka ........... H01M 8/1048
429/492

(Continued)

FOREIGN PATENT DOCUMENTS

EP 1689012 A1 * 8/2006 .............. H01M 4/90
JP 2005327637 A 11/2005
(Continued)

OTHER PUBLICATIONS

Seno et al; "Fuel Battery Cell"; EPO Patent Translate; Machine Translation of JP2007141492A (Year: 2012).*

(Continued)

*Primary Examiner* — Allison Bourke
*Assistant Examiner* — Charlene Bermudez
(74) *Attorney, Agent, or Firm* — Viering, Jentschura & Partner mbB; Robert M Bilotta, Jr.

(57) ABSTRACT

An intermediate layer containing $CeO_2$ with which a rare earth element (excluding Ce) forms a solid solution and a first electrode layer may be disposed in this order on a surface on one side of a solid electrolyte layer containing Zr, and a second electrode layer may be disposed on a surface on another side opposite the surface of the one side of the solid electrolyte layer. The intermediate layer includes a first layer located closer to the solid electrolyte layer and a second layer disposed on the first layer and located closer to the first electrode layer, and a concentration of the rare earth element of the first layer may be greater than a concentration of the rare earth element of the second layer.

19 Claims, 3 Drawing Sheets

(51) Int. Cl.
*H01M 4/86* (2006.01)
*H01M 8/12* (2016.01)
*H01M 8/1213* (2016.01)
*H01M 8/1253* (2016.01)
*H01M 8/249* (2016.01)

(58) Field of Classification Search
CPC ............ H01M 8/1253; H01M 8/1246; H01M 8/1004; H01M 8/124; H01M 8/126; H01M 2008/1293; H01M 8/2459; H01M 8/241; H01M 8/2432; H01M 4/8642; H01M 4/8657; H01M 4/8621; H01M 4/905; H01M 4/366; H01M 4/00; H01M 4/42; H01M 8/10; H01M 8/1006; H01M 8/1009; H01M 8/122; H01M 8/1233; H01M 8/02; H01M 8/0289; H01M 8/0693; H01M 8/1016; H01M 8/1067; H01M 8/24; H01M 8/249; H01M 2300/0065; H01M 2300/0085; H01M 2300/0094; H01M 2300/002; H01M 2300/0048; H01M 2300/0071; H01M 2300/0074; H01M 2300/0088; H01M 2300/0091; H01M 8/08; H01M 8/1007; H01M 8/1041; H01M 8/2425; H01M 8/244; H01M 2008/1095; H01M 2250/20; H01M 8/006; H01M 8/0202; H01M 8/0223; H01M 8/0226; H01M 8/023; H01M 8/0241; H01M 8/0243; H01M 8/0245; H01M 8/12; H01M 8/1226; H01M 8/141; H01M 8/142

See application file for complete search history.

(56) References Cited

U.S. PATENT DOCUMENTS

| | | | | |
|---|---|---|---|---|
| 2005/0095496 | A1* | 5/2005 | Hori | H01M 8/126 429/516 |
| 2010/0159356 | A1* | 6/2010 | Mahoney | H01M 4/8885 429/495 |
| 2010/0266925 | A1* | 10/2010 | Hori | H01M 8/1213 429/465 |
| 2011/0151353 | A1* | 6/2011 | Haug | H01M 4/8814 429/482 |
| 2011/0256464 | A1* | 10/2011 | Muramatsu | H01M 8/1286 429/465 |
| 2011/0305972 | A1 | 12/2011 | Kobayashi et al. | |
| 2012/0189939 | A1* | 7/2012 | Fujimoto | H01M 8/126 429/465 |
| 2012/0264035 | A1* | 10/2012 | Kobayashi | H01M 8/126 429/482 |
| 2016/0064770 | A1* | 3/2016 | Lee | H01M 10/0565 429/188 |

FOREIGN PATENT DOCUMENTS

| | | | | |
|---|---|---|---|---|
| JP | 2007141492 | A * | 6/2007 | |
| JP | 2008226653 | A | 9/2008 | |
| JP | 2008226654 | A | 9/2008 | |
| JP | 2012181928 | A * | 9/2012 | |
| JP | 2016081719 | A * | 5/2016 | |
| WO | WO2003077340 | A2 * | 3/2003 | ............ H01M 8/10 |
| WO | 2011052692 | A1 | 5/2011 | |

OTHER PUBLICATIONS

Fujisaki et al; "JP2016081719—Fuel Cell"; Machine translation of JP 2016/081719 A obtained from WIPO Patentscope (Year: 2016).*
Fujisaki et al; "JP2016081719—Fuel Cell"; Machine translation of JP-2016081719-A obtained from WIPO IP Portal (Year: 2016).*
Iwasaki; "1. JP2012181928—Solid Oxide Fuelcell and Fuel Cell Module"; Machine translation of JP-2012181928-A obtained from WIPO IP Portal (Year: 2012).*
Ali et al, "Synthesis of α-Zirconium Phosphate from Acetyl Acetonate Solution; a Comparative Synthesis Study of α-ZrP", Phosphorous Research Bulletin vol. 22, 2008 (Year: 2008).*

* cited by examiner

CELL, CELL STACK DEVICE, MODULE, AND MODULE HOUSING DEVICE

CROSS-REFERENCE TO RELATED APPLICATIONS

This application is a national stage entry according to 35 U.S.C. 371 of PCT Application No. PCT/JP2017/045517 filed on Dec. 19, 2017, which claims priority to Japanese Application No. 2016-246698 filed on Dec. 20, 2016, which are entirely incorporated herein by reference.

TECHNICAL FIELD

The present disclosure relates to a cell, a cell stack device, a module and a module housing device.

BACKGROUND

In recent years, as next-generation energy sources, cell stack devices have been proposed, in which a plurality of fuel cells which are capable of obtaining electrical power using fuel gas (hydrogen-containing gas) and oxygen-containing gas (air) are arranged in a manifold.

In such a fuel cell, a fuel electrode layer containing $ZrO_2$ with which Ni and rare earth elements form a solid solution; a solid electrolyte layer containing $ZrO_2$ with which rare earth elements form a solid solution; and an air electrode layer formed of a perovskite composite oxide containing Sr are provided in this order on an electrically conductive supporting substrate.

For example, Patent Documents 1 and 2 (Patent Document 1: JP 2008-226653 A and Patent Document 2: JP 2008-226654 A) propose a fuel cell in which an intermediate layer formed of $CeO_2$ with which rare earth elements (excluding Ce) form a solid solution is provided between a solid electrolyte layer and an air electrode layer.

SUMMARY

The cell of a non-limiting aspect of the present disclosure may include an intermediate layer containing a ceria oxide with which a rare earth element forms a solid solution and a first electrode layer in this order on a surface on one side of a solid electrolyte layer containing Zr. The cell may include a second electrode layer on a surface of another side opposite the surface of the one side of the solid electrolyte layer. The intermediate layer may include a first layer located closer to the solid electrolyte layer and a second layer disposed on the first layer and located closer to the first electrode layer. A concentration of the rare earth element of the first layer may be greater than a concentration of the rare earth element of the second layer.

A cell stack device of a non-limiting aspect of the present disclosure may include a plurality of the cells described above, the plurality of cells being electrically connected with each other.

A module of a non-limiting aspect of the present disclosure may include the cell stack device described above contained in a housing.

A module housing device of a non-limiting aspect of the present disclosure may include the module described above and an auxiliary device configured to operate the module. The module and the auxiliary device may be contained in an external casing.

BRIEF DESCRIPTION OF DRAWINGS

FIG. 1A is a partially cutaway horizontal cross-sectional view, and FIG. 1B is a side view.

FIG. 3B is a surface analysis photograph in which FIG. 3A is mapped and surface analyzed by an EPMA method with a rare earth element Gd.

DETAILED DESCRIPTION

The present non-limiting embodiments are described below with reference to the drawings.

Figure 1A:
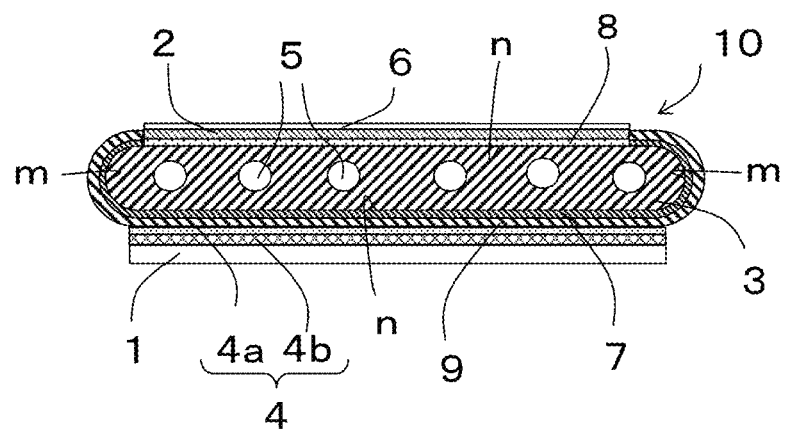
FIGS. 1A and 1B illustrate an example of a cell of a present non-limiting embodiment.
Figure 1B:
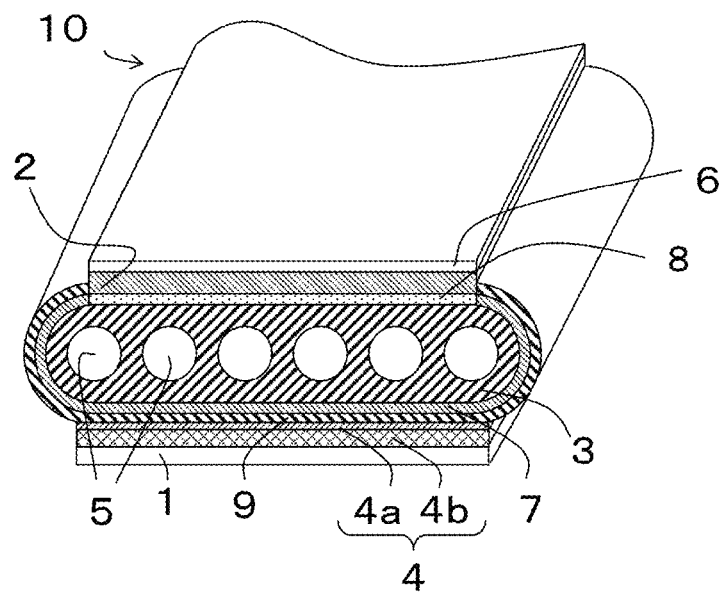
Figure 2:
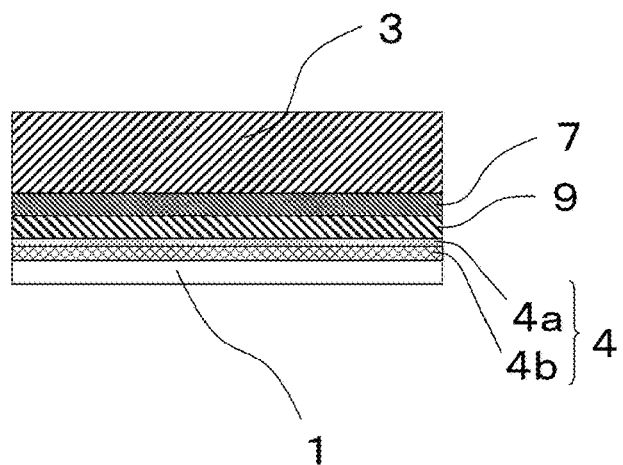
FIG. 2 is an enlarged cross-sectional view in which a part of a power generation unit of one example of a cell of a present non-limiting embodiment is extracted and illustrated.

FIG. 1A illustrates a cross-section of a cell 10 having a hollow plate shape, and FIG. 1B is a partially cutaway perspective view of a cell. Note that, in both drawings, some components of the cell 10 are illustrated in an enlarged manner. Note that FIG. 2 is an enlarged cross-sectional view in which a part of a power generating unit of the cell 10 illustrated in FIGS. 1A and 1B is extracted and illustrated. Note that, in the following description, a first electrode layer is an air electrode layer, and a second electrode layer is a fuel electrode layer.

The cell 10 includes an electrically conductive supporting substrate 3 having an elliptical pillar shape in its entirety. In the interior of the electrically conductive supporting substrate 3, a plurality of fuel gas paths 5 extending in the longitudinal direction are formed at predetermined intervals, and the cell 10 has a structure in which various members are provided on the electrically conductive supporting substrate 3.

As is understood from the shape illustrated in FIG. 1A, the electrically conductive supporting substrate 3 includes a flat portion n and arc-shaped portions m at both ends of the flat portion n. The both surfaces of the flat portion n are substantially parallel to each other, a fuel electrode layer 7 is provided covering one surface (lower surface) of the flat portion n and the arc-shaped portions m on the both sides of the flat portion n, and further, a dense solid electrolyte layer 9 is layered covering the fuel electrode layer 7. In addition, on the solid electrolyte layer 9, an air electrode layer 1 is layered facing the fuel electrode layer 7 with an intermediate layer 4 therebetween. An interconnector 2 is provided on the other surface of the flat portion n where the fuel electrode layer 7 and the solid electrolyte layer 9 are not layered. As is clear from FIGS. 1A and 1B, the fuel electrode layer 7 and the solid electrolyte layer 9 extend to both sides of the interconnector 2 via the arc-shaped portions m located on both ends of the cell 10 such that the surface of the electrically conductive supporting substrate 3 is not exposed to the outside.

Here, in the cell 10, a portion of the fuel electrode layer 7 that faces (opposite to) the air electrode layer 1 functions as a fuel electrode to generate power. That is, the oxygen-containing gas, such as air, is fed to the outside of the air electrode layer 1, the fuel gas (the hydrogen-containing gas) is fed to the gas paths 5 inside the electrically conductive supporting substrate 3, and then, power is generated by heating the gas to a predetermined operation temperature. Then, the current generated by such power generation is collected via the interconnector 2 attached to the electrically conductive supporting substrate 3. Below, the components constituting the cell 10 are described.

The electrically conductive supporting substrate 3 is required to have gas permeability to allow the fuel gas to pass therethrough to the fuel electrode layer 7 and electrical conductivity for collecting current via the interconnector 2. In view of this, the electrically conductive supporting substrate 3 may be formed from an iron group metal component and a rare earth element oxide, for example.

Examples of the iron group metal component include an iron group metal alone, an iron group metal oxide, an iron group metal alloy, or an iron group alloy oxide. More specifically, examples of the iron group metal include Fe, Ni (nickel), and Co. Although any of them may be used, Ni and/or NiO may be contained as the iron group component since they are inexpensive and stable in the fuel gas in the present non-limiting embodiment. Note that a plurality of iron group metal components may be contained.

Further, the rare earth element oxide is used to bring the thermal expansion coefficient of the electrically conductive supporting substrate 3 closer to the thermal expansion coefficient of the solid electrolyte layer 9. For example, rare earth element oxides including at least one element selected from the group consisting of Y, Lu (lutetium), Yb, Tm (thulium), Er (erbium), Ho (holmium), Dy (dysprosium), Gd, Sm, and Pr (praseodymium) are used in combination with the above-mentioned iron group component. Specific examples of such a rare earth element oxide include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. In particular, $Y_2O_3$ and $Yb_2O_3$ may be used since they hardly form a solid solution with and react with the oxides of the iron group metal, have thermal expansion coefficients approximately equal to that of the solid electrolyte layer 9, and are inexpensive.

In addition, in view of maintaining favorable electrical conductivity of the electrically conductive supporting substrate 3 and bringing the thermal expansion coefficient close to that of the solid electrolyte layer 9, the volume ratio after firing-reduction may be set such that the ratio of the iron group metal component to the rare earth element oxide (e.g., Ni:$Y_2O_3$) falls within a range from 35:65 to 65:35 in volume ratio (e.g., iron group metal component/(iron group metal component+Y) is from 65 to 86 mole % in molar ratio). Note that the electrically conductive supporting substrate 3 may contain any other metal component and oxide component as long as the required characteristics are not sacrificed.

In addition, since the electrically conductive supporting substrate 3 is required to have fuel gas permeability, the porosity may be 20% or greater, more specifically, from 25 to 50%. In addition, the electrical conductivity of the electrically conductive supporting substrate 3 may be 50 S/cm or greater in a present non-limiting embodiment, 300 S/cm or greater in another present non-limiting embodiment, or 440 S/cm or greater in yet another present non-limiting embodiment.

In the cell 10 having a hollow plate shape illustrated in FIGS. 1A and 1B, the thickness of the electrically conductive supporting substrate 3 (thickness between both surfaces of the flat portion n) may be from 1.5 to 5 mm in a case where the length of the flat portion n of the electrically conductive supporting substrate 3 (length in the width direction of the electrically conductive supporting substrate 3) is from 15 to 35 mm and where the length of the arc-shaped portion m (length of the arc) is from 2 to 8 mm.

The fuel electrode layer 7 is used for an electrode reaction and may be formed of a known porous electrically conductive ceramic. For example, it may be formed of $ZrO_2$ with which rare earth elements (excluding Zr) forms a solid solution or $CeO_2$ with which rare earth elements (excluding Ce) forms a solid solution, and Ni and/or NiO.

In the fuel electrode layer 7, the content of $ZrO_2$ with which rare earth elements (excluding Zr) form a solid solution or $CeO_2$ with which rare earth elements (excluding Ce) form a solid solution; and the content of Ni or NiO may be set such that the volume ratio after firing-reduction of Ni to $ZrO_2$ with which rare earth elements (excluding Zr) form a solid solution (Ni:YSZ) or to $CeO_2$ with which rare earth elements (excluding Ce) form a solid solution ranges from 35:65 to 65:35 in a volume ratio. Further, the porosity of the fuel electrode layer 7 may be 15% or greater, more specifically from 20 to 40%, and the thickness thereof may be from 1 to 30 μm. For example, by setting the thickness of the fuel electrode layer 7 within the above-mentioned range, the power generation performance can be increased, and by setting the thickness within the above-mentioned range, peeling and the like due to a thermal expansion difference between the solid electrolyte layer 9 and the fuel electrode layer 7 can be prevented or minimized.

While the fuel electrode layer 7 extends to both side surfaces of the interconnector 2 in the example illustrated in FIGS. 1A and 1B, it suffices that the fuel electrode layer 7 is disposed at a position facing the air electrode layer 1. For example, the fuel electrode layer 7 may be provided only on the flat portion n on the side on which the air electrode layer 1 is provided. Further, the interconnector 2 may be provided directly on the flat portion n of the electrically conductive supporting substrate 3 on the side where the solid electrolyte layer 9 is not provided, and in this case, the potential drop between the interconnector 2 and the electrically conductive supporting substrate 3 can be prevented or minimized.

The solid electrolyte layer 9 provided on the fuel electrode layer 7 may be formed of a dense ceramic made of partially stabilized or stabilized $ZrO_2$ containing a rare earth element such as Y (yttrium), Sc (scandium), and Yb (ytterbium) in an amount from 3 to 15 mol %. Further, Y may be used as the rare earth element in terms of inexpensiveness. Further, to prevent gas permeation, the solid electrolyte layer 9 may have a relative density (according to the Archimedes method) of 93% or greater, more specifically 95% or greater, and may have a thickness from 3 to 50 μm.

The air electrode layer 1 may be formed of an electrically conductive ceramic formed of so-called $ABO_3$ perovskite composite oxide. Examples of such a perovskite composite oxide may include a perovskite transition metal oxide, specifically, at least one of an $LaMnO_3$-based oxide, an $LaFeO_3$-based oxide, and an $LaCoO_3$-based oxide containing Sr and La (lanthanum) in the A site. In particularly, an $LaCoO_3$-based oxide may be used in view of its high electric conductivity at operation temperatures from about 600 to about 1000° C. Note that, in the perovskite composite oxide containing Sr and La in the A site, Fe (iron) or Mn (manganese) may be present with Co in the B site.

In addition, since the air electrode layer 1 is required to have gas permeability, the electrically conductive ceramic (perovskite oxide) of the air electrode layer 1 may have a porosity of 20% or greater, more specifically from 30 to 50%. Further, the air electrode layer 1 may have a thickness from 30 to 100 μm in view of the current collection performance.

While the interconnector 2 may be formed of an electrically conductive ceramic, the interconnector 2 is required to have reduction resistance and oxidation resistance since the interconnector 2 comes in contact with the fuel gas (hydrogen-containing gas) and the oxygen-containing gas (air). As such, a lanthanum chromite-based perovskite composite oxide ($LaCrO_3$-based oxide) is typically used as an electrically conductive ceramic having reduction resistance and oxidation resistance. In addition, such an electrically conductive ceramic should be dense in order to prevent the leakage of the fuel gas flowing inside the electrically conductive supporting substrate 3 and the oxygen-containing gas flowing outside the electrically conductive supporting substrate 3. As such, the electrically conductive ceramic has a relative density of 93% or greater, more specifically 95% or greater.

In addition, the thickness of the interconnector 2 may be from 3 to 200 μm in order to prevent gas leakage and not to have excessive electrical resistance. By setting the thickness within such a range, gas leakage is less likely to occur, the electrical resistance is not excessively increased, and thus the current collecting function can be increased.

Note that a cohesion layer 8 having a composition similar to that of the fuel electrode layer 7 may be formed between the interconnector 2 and the electrically conductive supporting substrate 3 in order to reduce the difference in thermal expansion coefficients between the interconnector 2 and the electrically conductive supporting substrate 3. FIGS. 1A and 1B illustrate a state where the cohesion layer 8 having a composition similar to that of the fuel electrode layer 7 is provided between the interconnector 2 and the electrically conductive supporting substrate 3.

In addition, a p-type semiconductor layer 6 may be provided on an outer surface (upper surface) of the interconnector 2. In a case that the current collector is connected to the interconnector 2 through the p-type semiconductor layer 6, they make an ohmic contact with each other, and thus the voltage drop can be reduced, making it possible to effectively avoid reduction in current collection performance.

Examples of the p-type semiconductor layer 6 may include a layer made of a perovskite transition metal oxide. Specifically, a material that has a greater electron conductivity than that of the $LaCrO_3$ oxide of the material forming the interconnector 2, such as a p-type semiconductor ceramic made of at least one of an $LaMnO_3$ oxide, an $LaFeO_3$ oxide, and an $LaCoO_3$ oxide having Mn, Fe, Co, or the like at the B site may be used, for example. The thickness of the p-type semiconductor layer 6 may be from 30 to 100 μm.

As illustrated in FIG. 2, in the cell 10 of the present non-limiting embodiment, the intermediate layer 4 including $CeO_2$ with which rare earth elements (excluding Ce) form a solid solution is provided on the surface of the solid electrolyte layer 9. Here, the intermediate layer 4 includes a first layer 4*a* located closer to the solid electrolyte layer 9 and a second layer 4*b* provided on the first layer 4*a* and located closer to the air electrode layer 1. The first layer 4*a* is a layer having a concentration of rare earth elements greater than that of the second layer 4*b*.

Figure 3A:
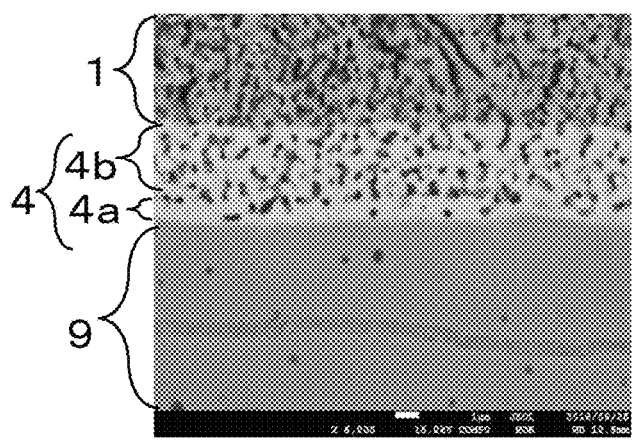
FIG. 3A is a cross-sectional SEM photograph of a cell in which an intermediate layer is provided between a solid electrolyte layer and an air electrode layer in one example of a cell of a present non-limiting embodiment.
Figure 3B:
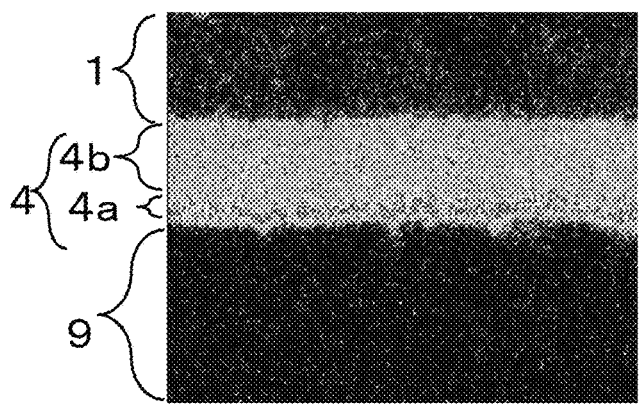

FIGS. 3A and 3B illustrate a cell adopting Gd as the rare earth element constituting the intermediate layer 4. FIG. 3A is a cross-sectional SEM photograph of a cell provided with the intermediate layer 4 between the solid electrolyte layer 9 and the air electrode layer 1 in one example of the cell of the present non-limiting embodiment. FIG. 3B is a surface analysis photograph in which FIG. 3A is mapped by an EPMA method with a rare earth element Gd. The EPMA method is an analytical technique using an Electron Probe Micro Analyzer (EPMA).

As illustrated in FIG. 3A, in the cell 10 of the present non-limiting embodiment, the first layer 4*a* is provided on the surface of the solid electrolyte layer 9, the second layer 4*b* is provided on the surface of the first layer 4*a*, and the air electrode layer 1 is provided on the surface of the second layer 4*b*. As illustrated in FIG. 3B, the first layer 4*a* provided closer to the solid electrolyte layer 9 of the intermediate layer 4 has a dark color. This indicates that Gd, which is a rare earth element, is concentrated, and the Gd concentration is greater than that of the second layer 4*b*. In other words, the intermediate layer 4 includes the first layer 4*a* located closer to the solid electrolyte layer 9 and the second layer 4*b* provided on the first layer 4*a* and located closer to the air electrode layer 1, and the first layer 4*a* has a greater concentration of the rare earth element Gd than that of the second layer 4*b*.

In fuel cells proposed in the related art, the Ce in the intermediate layer diffuses into the solid electrolyte layer and reacts with the Zr of the solid electrolyte layer to form a highly resistive reaction product, and consequently, the power generation performance of the fuel cell in long periods of power generation may be degraded.

In contrast, in the cell 10 of the present non-limiting embodiment, the intermediate layer 4 includes the first layer 4*a* having a greater concentration of rare earth elements than that of the second layer 4*b*, the first layer 4*a* being located closer to the solid electrolyte layer 9. This can prevent the Ce in the intermediate layer 4 from diffusing into the solid electrolyte layer 9. This also prevents a reaction product (reaction layer) having a great electrical resistance from being generated due to a reaction between the Zr of the components of the solid electrolyte layer 9 and the Ce of the components of the intermediate layer 4 and prevents the power generation performance of the cell 10 from degrading in long periods of power generation.

The concentration of the rare earth elements (excluding Ce) in the intermediate layer 4 (first layer 4*a* and second layer 4*b*) may be determined by a quantitative analysis using the above-mentioned EPMA method.

The intermediate layer 4 including the first layer 4*a* and the second layer 4*b* may be produced by the following method.

The first layer 4*a* of the intermediate layer 4 may be formed, for example, by methods such as a printing method in which a solvent or the like is added to the raw material powder to produce a slurry and the slurry is applied by printing, an ink-jet method in which droplets are continuously dripped and applied by a nozzle, and a vapor deposition method such as Pulsed Laser Deposition (PLD) and Ion Assist Vapor Deposition (IAD).

In addition, the second layer 4*b* of the intermediate layer 4 may be film-formed by, for example, the above-mentioned printing method in which a slurry is produced and applied by printing.

In a case that the first layer 4*a* and second layer 4*b* are produced by a printing method, the raw material powder may have a composition represented by $(CeO_2)_{1-x}(REO_{1.5})x$, where RE is at least one of Sm, Y, Yb, and Gd, and x is a number that satisfies $0 < x \leq 0.3$.

In particular, $CeO_2$ with which Gd and Sm form a solid solution may be adopted, and the raw material powder thereof may have a composition represented by $(CeO_2)_{1-x}(SmO_{1.5})_x$ or $(CeO_2)_{1-x}(GdO_{1.5})_x$, where x is a number that satisfies $0<x\leq 0.3$. Further, to reduce electrical resistance, $CeO_2$ with which 10 to 20 mol % of $SmO_{1.5}$ or $GdO_{1.5}$ forms a solid solution may be used.

In addition, since each of the first layer 4a and the second layer 4b contains $CeO_2$, the bonding strength between the first layer 4a and the second layer 4b can be improved, and the thermal expansion coefficients of the first layer 4a and the second layer 4b can be reduced. This can bring the thermal expansion coefficient of the intermediate layer 4 close to the thermal expansion coefficient of the solid electrolyte layer 9, and therefore, cracking and peeling due to the difference in thermal expansion can be prevented or minimized.

Note that the first layer 4a and the second layer 4b may contain oxides of other rare earth elements (e.g., $Y_2O_3$, $Yb_2O_3$, or the like) in order to produce the increased effect of preventing or minimizing the formation of the reaction product of the Zr of the solid electrolyte layer 9 and the Ce in the intermediate layer 4.

In addition, in the intermediate layer 4, the first layer 4a may be denser than the second layer 4b.

This can effectively prevent Ce from diffusing by the dense first layer 4a and prevent a reaction layer having high electrical resistance due to a reaction between the Zr in the solid electrolyte layer 9 and the Ce in the intermediate layer 4 from being formed in the solid electrolyte layer 9.

As an example of the method of producing the intermediate layer 4, a slurry that serves as the first layer 4a is applied to the surface of the solid electrolyte layer 9, and the solid electrolyte layer 9 and the first layer 4a are provided by simultaneous firing (simultaneous sintering). Next, a slurry that serves as the second layer 4b is applied to the surface of the first layer 4a, and then the second layer 4b is baked and sintered. In other words, the second layer 4b is provided in a separated step after the solid electrolyte layer 9 and the first layer 4a have been provided by simultaneous firing. As described, since the solid electrolyte layer 9 and the first layer 4a are provided by simultaneous firing at high temperatures, the first layer 4a can be made dense, thus making it possible to make the first layer 4a denser than the second layer 4b.

Further, another method of producing the intermediate layer 4 may be that the first layer 4a is provided on the surface of the solid electrolyte layer 9 by the above-mentioned vapor deposition method, then the slurry that serves as the second layer 4b is applied to the surface of the first layer 4a, and thereafter, the first layer 4a and the second layer 4b are simultaneously baked and sintered so as to provide the intermediate layer 4 on the surface of the solid electrolyte layer 9. Since a dense film can be provided by the vapor deposition method, the first layer 4a can be made denser than the second layer 4b.

The configuration in which the first layer 4a is denser than the second layer 4b means that the second layer 4b has a density less than that of the first layer 4a. In view of this, for example, in the case where the air electrode layer 1 is provided after the second layer 4b is provided, the bonding strength can be improved by anchoring effect. As a result, the peeling of the air electrode layer 1 from the second layer 4b can be prevented or minimized, and degradation of the power generation performance of the cell 10 in long periods of power generation can be prevented or minimized. Note that since the contact area between the second layer 4b and the air electrode layer 1 can be increased, the reaction resistance can be reduced.

By reducing the density of the second layer 4b, the rigidity of the second layer 4b can be reduced, and a thermal stress can also be reduced even in a case where the thermal stress is generated by the thermal expansion difference with the air electrode layer 1. In addition, the peeling of the air electrode layer 1 from the second layer 4b can be prevented or minimized, and degradation of the power generation performance of the cell 10 in long periods of power generation can be prevented or minimized.

The concentration of the rare earth elements of the first layer 4a may be from 1.05 times to three times the concentration of the rare earth elements of the second layer 4b.

In a case that the concentration of the rare earth elements in the first layer 4a is less than 1.05 times, the concentration of the rare earth elements in the first layer 4a is too low, and diffusion of Ce in the intermediate layer 4 into the solid electrolyte layer 9 cannot be effectively prevented, making it difficult to prevent degradation of the power generation performance of the cell. In addition, in a case that the concentration of the rare earth elements in the first layer 4a is greater than three times, the concentration of the rare earth elements in the first layer 4a may be too high, and the electrical conductivity may decrease, and, the power generation performance of the cell may be degraded. For example, the concentration of the rare earth elements in the first layer 4a is from 3 mass % to 8 mass %.

The thickness of the first layer 4a may be set to from 1/50 to 1/2 of the total thickness of the intermediate layer 4.

In a case that the thickness of the first layer 4a is less than 1/50, the first layer 4a is too thin, and diffusion of the Ce in the intermediate layer 4 into the solid electrolyte layer 9 may not be effectively prevented, making it difficult to prevent degradation of the power generation performance of the cell. In addition, in a case that the thickness of the first layer 4a is greater than 1/2, the first layer 4a is too thick, and the difference in thermal expansion between the solid electrolyte layer 9 and the first layer 4a may become large, and the power generation performance of the cell may be degraded.

For example, the total thickness of the intermediate layer 4 is from 3 μm to 5 μm, and the thickness of the first layer 4a is from 0.06 μm to 2.5 μm.

A method of manufacturing the above-mentioned cell 10 having a hollow plate shape is described below.

First, a green body is prepared by mixing an iron group metal of Ni or the like or an oxide powder thereof; a powder of a rare earth element oxide such as $Y_2O_3$; an organic binder; and a solvent. An electrically conductive supporting substrate compact is produced by extrusion molding using the green body and is dried. Note that a calcinated body obtained by calcination of the electrically conductive supporting substrate compact at 900 to 1000° C. for from 2 to 6 hours may be used as the electrically conductive supporting substrate compact.

Next, raw materials of NiO and $ZrO_2$ (YSZ) with which $Y_2O_3$ forms a solid solution are weighed and mixed in accordance with a predetermined compounding composition. After this, a slurry for the fuel electrode layer is prepared by mixing an organic binder and a solvent in the mixed powder.

Then, a slurry formed by adding toluene, a binder, a commercially available dispersing agent, and the like to $ZrO_2$ powder with which rare earth elements (excluding Zr) form a solid solution is molded using a doctor blade method or the like to produce a sheet-shaped solid electrolyte layer compact. The slurry for the fuel electrode layer is applied to the obtained sheet-shaped solid electrolyte layer compact to form a fuel electrode layer compact, and the electrically conductive supporting substrate compact is layered on the surface of the resultant closer to the fuel electrode layer compact. Note that after the slurry for the fuel electrode layer is applied and dried on a predetermined location of the electrically conductive supporting substrate compact, the solid electrolyte layer compact on which the slurry for the fuel electrode layer is applied may be layered on the electrically conductive supporting substrate compact.

Next, a slurry is prepared by mixing an interconnector material (e.g., an $LaCrO_3$ based oxide powder), an organic binder, and a solvent, and the slurry is formed into a sheet shape to produce a sheet for an interconnector. Then, the sheet is layered to the exposed surface of the electrically conductive supporting substrate compact where the solid electrolyte layer compact is not formed to produce a layered compact.

Next, the intermediate layer 4 is formed.

As an example of the method of producing the intermediate layer 4, the following describes a method of forming the intermediate layer 4 on the surface of the solid electrolyte layer 9 by compounding, applying, and firing a slurry for the first layer 4a and a slurry for the second layer 4b.

For example, raw material powder for the first layer compact and raw material powder for the second layer compact of the intermediate layer compact is prepared by wet-pulverizing $CeO_2$ powder with which $GdO_{1.5}$ and/or $SmO_{1.5}$ form a solid solution.

At this time, the raw material powder for the first layer compact is prepared such that the amount of the rare earth elements $GdO_{1.5}$ and/or $SmO_{1.5}$ is greater than that of the raw material powder for the second layer compact. Wet-pulverizing is performed for from 10 to 20 hours with a ball mill using a solvent, for example.

Next, the slurry for the first layer 4a is produced by adding toluene as a solvent to the raw material powder for the first layer compact having an adjusted degree of agglomeration, and the first layer compact is produced by applying the slurry to the solid electrolyte layer compact. Note that a sheet-shaped first layer compact may be produced and layered on the solid electrolyte layer compact.

Next, the above-mentioned first layer compact is subjected to a binder removal treatment and fired in an oxygen-containing atmosphere for from 2 to 6 hours at from 1500 to 1600° C.

Next, a slurry for the second layer is produced by adding toluene as a solvent to the above-mentioned raw material powder for the second layer compact having an adjusted degree of agglomeration, a second layer compact is produced by applying the slurry for the second layer 4b to the surface of the first layer 4a formed by firing, and the resultant is fired. In the firing of the second layer compact, the temperature may be lower than the firing temperature of the solid electrolyte layer 9 and the first layer 4a by at least 100° C., and for example, the temperature may be from 1100° C. to 1400° C.

Note that in a case where the second layer 4b includes a plurality of layers, the respective layers of the second layer 4b may be produced by appropriately adjusting the method. For example, slurries are produced by adjusting the raw material powder as described above and adding toluene to the raw material powder, the slurries are applied and layered in sequence, and the resultant is fired for each layer.

As another method of producing the intermediate layer 4, the following describes a method of forming the intermediate layer 4 on the surface of the solid electrolyte 9. In the method, the first layer 4a is formed by a vapor deposition method, and the second layer 4b is formed by compounding, applying, and firing a slurry.

After the above-mentioned process of producing the layered compact has been performed, the layered compact is subjected to a binder removal treatment, and the resultant is fired in an oxygen-containing atmosphere for from 2 to 6 hours at from 1500 to 1600° C.

Next, films including Gd that serve as the first layer 4a of the intermediate layer 4 are formed by the above-mentioned vapor deposition method on the surface of the solid electrolyte layer 9. Specifically, during vacuum deposition, a gas ion ($Ar^+$ ion, $O2^-$ ion) of about several 100 eV is emitted to the substrate by an ion gun, and by the kinetic energy thereof, the first layer 4a that dendritically grows is destroyed and compressed to form a dense film.

Next, the slurry for the second layer that serves as the second layer 4b of the intermediate layer 4 is applied to the surface of the plurality of films including Gd serving as the first layer 4a to produce a second layer compact. For example, raw material powder for the second layer compact of the intermediate layer 4 is prepared by performing a thermal treatment on $CeO_2$ powder with which $GdO_{1.5}$ and/or $SmO_{1.5}$ forms a solid solution for from 2 to 6 hours at from 800 to 900° C. and then performing wet-pulverizing to adjust the degree of agglomeration to from 3 to 35. Desirably, the wet-pulverizing is performed for from 10 to 20 hours with a ball mill using a solvent. Note that the same applies to a case where the second layer is formed with $CeO_2$ powder with which $SmO_{1.5}$ forms a solid solution.

The slurry for the second layer is produced by adding toluene as a solvent to the raw material powder for the second layer compact having an adjusted degree of agglomeration, and the slurry for the second layer is applied to the surface of the first layer 4a formed by the vapor deposition method to produce a second layer compact.

Thereafter, the second layer compact is baked at a temperature of from 1100 to 1400° C. for from 4 to 6 hours, and as a result, the first layer 4a becomes a dense single layer.

Note that in the case where the second layer 4b includes a plurality of layers, the layers of the second layer 4b may be produced by appropriately adjusting the method. For example, slurries are produced by adjusting the raw material powder as described above and adding toluene to the raw material powder, the slurries are applied and layered in sequence, and the resultant is fired for each layer.

Next, a slurry containing a material for the air electrode layer (e.g., an $LaCoO_3$-based oxide powder), a solvent, and a pore-forming agent is applied to the second layer 4b by dipping or the like. The hollow-plate cell 10 having the structure illustrated in FIGS. 1A and 1B can be produced as following. A slurry containing a material for a p-type semiconductor layer (e.g., an $LaCoO_3$-based oxide powder) and solvent is applied to a predetermined position of the interconnector 2 by dipping or the like, and the resultant is baked for from 2 to 6 hours at from 1000 to 1300° C. Note that hydrogen gas is supplied into the cell 10 to perform reduction treatment on the electrically conductive supporting substrate 3 and the fuel electrode layer 7. The reduction treatment may be performed for from 5 to 20 hours at from 750 to 1000° C., for example.

In the cell 10 produced in this manner, the intermediate layer 4 includes the first layer 4a located closer to the solid electrolyte layer 9 and the second layer 4b provided on the first layer 4a and located closer to the first electrode layer (air electrode layer) 1, and the first layer 4a may be a layer having a greater concentration of a rare earth element Gd than that of the second layer 4b.

Further, in the cell 10 of the present non-limiting embodiment, $CeO_2$ particles with which the Gd constituting the first layer 4a forms a solid solution may include particles having a flat shape (hereinafter, also referred to as flat particles) whose ratio of a length (long axis) in a direction orthogonal to the thickness direction of the intermediate layer 4 to a length (short axis) in the thickness direction of the intermediate layer 4 is greater than 1.0. In other words, the first layer 4a may include particles having an aspect ratio greater than 1.0.

This can reduce the contact ratio of the particle interface of the first layer 4a to the solid electrolyte layer 9. Thus, the resistance at conduction of oxygen ions can be suppressed, and the ionic conductivity of the first layer 4a can be improved.

In addition, the proportion of the flat particles constituting the first layer 4 may be at least 1% or greater, 10% or greater, 30% or greater, or particularly 70% or greater, with respect to the number of $CeO_2$ particles with which Gd forms a solid solution in any SEM photograph illustrating the cross section. This can prevent a highly resistive reaction product from forming more efficiently and can improve the ionic conductivity of the first layer 4a.

Note that the aspect ratio of the flat particles may be set to 1.2 or greater. In a case that the aspect ratio is less than 1.2, the effect of improving the ionic conductivity of the first layer 4a may be reduced. Note that considering the manufacturing process of the first layer 4, the aspect ratio may be set to 5 or less. Note that the aspect ratio in the present description may be an average value of particles having an aspect ratio of greater than 1.0.

Figure 4:
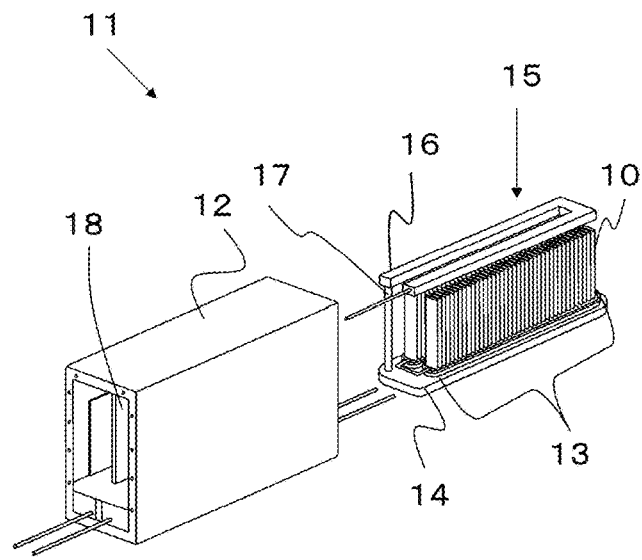
FIG. 4 is an external perspective view illustrating an example of a module including a cell according to a present non-limiting embodiment.

FIG. 4 is an external perspective view illustrating an example of a module 11 in which a cell stack device 15, which is housed in a housing 12, includes a cell stack 13 including a plurality of the cells 10 of the present non-limiting embodiment electrically connected in series with each other via a current collector member (not illustrated).

Here, a reformer 16 configured to generate fuel gas by reforming raw fuel such as natural gas or kerosene is disposed above the cell stack 13 for the purpose of obtaining the fuel gas to be used in the cell 10. The fuel gas generated in the reformer 16 is supplied to a manifold 14 via a gas circulation pipe 17 and is then supplied, via the manifold 14, to the fuel gas path 5 provided inside the cell 10.

In such a cell stack 13, a plurality of cells 10 having improved power generation performance at low temperatures are electrically connected in series, and thus the cell stack 13 with improved power generation performance at low temperatures can be provided.

Here, FIG. 4 illustrates a state where some parts (the front and back walls) of the housing 12 are detached, and the cell stack device 15 and the reformer 16 housed in the interior are removed to the rear side. Here, in the module 11 illustrated in FIG. 4, the cell stack device 15 may be housed by sliding it into the housing 12. Note that the cell stack device 15 may include the reformer 16.

In addition, in FIG. 4, an oxygen-containing gas introducing member 18 provided in the housing 12 is disposed between the cell stacks 13 juxtaposed with the manifold 14 and is configured to supply oxygen-containing gas to the lower end portion of the cell 10 such that the oxygen-containing gas flows from the lower end portions toward the upper end portions at the sides of the cell 10 in accordance with the flow of fuel gas. Then, by causing combustion of the oxygen-containing gas and the fuel gas discharged from the fuel gas path 5 of the cell 10 on the upper end portion side of the cell 10, the temperature of the cell 10 can be increased and the activation of the cell stack device 15 can be facilitated. In addition, the reformer 16 disposed above the cell 10 (the cell stack 13) can be heated by causing combustion of the oxygen-containing gas and the fuel gas discharged from the fuel gas path 5 of the cell 10 on the upper end portion side of the cell 10. This enables the reformer 16 to efficiently perform the reformation reaction.

Further, also in the module 11 of the present non-limiting embodiment, the cell stack device 15 including the cell stack 13 including the cell 10 having improved power generation performance at low temperatures is housed in the housing 12, and thus the module 11 with improved power generation efficiency at low temperatures can be provided.

Figure 5:
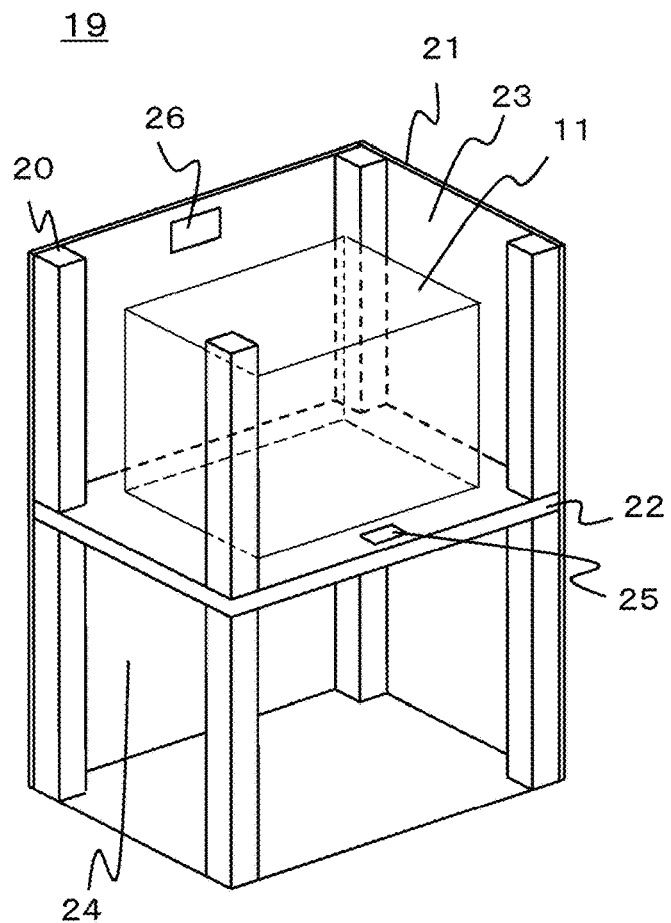
FIG. 5 is an exploded perspective view illustrating an example of a module housing device according to a present non-limiting embodiment, in which illustration of some parts is omitted.

FIG. 5 is an exploded perspective view illustrating an example of the fuel cell device according to the present non-limiting embodiment in which the module 11 illustrated in FIG. 4 and an auxiliary device (not illustrated) configured to operate the cell stack 13 (the cell stack device 15) are housed in an external casing. Note that a part of the configuration is omitted in FIG. 5.

In a module housing device 19 illustrated in FIG. 5, an external casing including supports 20 and external plates 21 is divided into upper and lower regions with a dividing plate 22. The upper region serves as a module housing chamber 23 for housing the above-described module 11. The lower region serves as an auxiliary device housing chamber 24 for housing auxiliary devices configured to operate the module 11. The auxiliary devices housed in the auxiliary device housing chamber 24 include a water supply device for supplying water to the module 11 and a supply device for supplying fuel gas and air, although the illustration of such auxiliary devices is omitted.

Further, an airflow hole 25 for allowing air in the auxiliary device housing chamber 24 to flow into the module housing chamber 23 is provided in the dividing plate 22, and an exhaust port 26 for exhausting air in the module housing chamber 23 is provided in a part of the external plate 21 of the module housing chamber 23.

As described above, in the module housing device 19, the module 11 having improved power generation performance at low temperatures is housed in the module housing chamber 23, and thus the module housing device 19 having improved power generation performance at low temperatures can be provided.

Various non-limiting aspects of the present disclosure have been described in detail above. However, the present disclosure is not limited to the embodiments described above, and various modifications or improvements can be made without departing from the essential spirit of the present disclosure.

For example, while a fuel cell having a hollow plate shape including the electrically conductive supporting substrate 3 as the cell 10 of the present non-limiting embodiment is described above, it is possible to adopt a cylindrical cell or a plate-shaped cell without the electrically conductive supporting substrate 3. For example, while a so-called vertical stripe cell is described in the above-described non-limiting embodiment, it is possible to adopt a so-called horizontal stripe cell in which a plurality of power generating elements are provided on a supporting substrate. In addition, it is possible to adopt a cell in which the air electrode layer 1, the intermediate layer 4, the solid electrolyte layer 9, and the fuel electrode layer 7 are layered in this order on the electrically conductive supporting substrate 3 in accordance with the configuration of each cell.

EXAMPLES

Example 1

First, an electrically conductive supporting body compact was produced by mixing NiO powder having an average particle diameter of 0.5 μm and $Y_2O_3$ powder having an average particle diameter of 2.0 μm, forming a green body with an organic binder and a solvent using an extrusion molding method, and then drying and degreasing the resultant. In the support body compact having been subjected to the reduction, the volume ratio of NiO was 48 volume %, and the volume ratio of $Y_2O_3$ was 52 volume %.

Next, a solid electrolyte layer sheet was produced by a doctor blade method using a slurry obtained by mixing a binder powder and a solvent in $ZrO_2$ powder having a particle diameter of 0.8 μm according to a micro-track method with which 8 mol % of $Y_2O_3$ formed a solid solution.

Next, a slurry for a fuel electrode layer was produced by mixing NiO powder having an average particle diameter of 0.5 μm; $ZrO_2$ powder with which $Y_2O_3$ forms a solid solution; an organic binder; and a solvent. This slurry was then applied to a solid electrolyte layer sheet by a screen-printing method and dried to form a fuel electrode layer compact.

A sheet-shaped layered compact obtained by forming the fuel electrode layer compact on the solid electrolyte layer sheet was layered at a predetermined position on the supporting body compact with its surface closer to the fuel electrode layer compact on the inside.

Next, a calcinated body was produced by performing a calcination process for 3 hours at 1000° C. on the layered compact in which the above-mentioned mold bodies are layered.

Next, a slurry for an interconnector layer in which La $(Mg_{0.3}Cr_{0.7})_{0.96}O_3$ having an average particle diameter of 0.7 μm, an organic binder, and a solvent were mixed was produced. The prepared slurry for the interconnector layer was applied to a portion where the fuel electrode layer of the supporting body (and the solid electrolyte layer) is not formed (a portion where the supporting body is exposed) in a center portion excluding the both ends of the calcinated body of the solid electrolyte.

Then, an intermediate layer was formed.

First, an electrically conductive supporting substrate compact was produced by mixing NiO powder having an average particle diameter of 0.5 μm and $Y_2O_3$ powder having an average particle diameter of 0.9 μm such that the volume ratios after firing and reduction of the Ni and the $Y_2O_3$ are 48 volume % and 52 volume %, respectively, forming a green body with an organic binder and a solvent using an extrusion molding method, and then drying and degreasing the resultant.

Next, a slurry for the fuel electrode layer was produced by mixing NiO powder having an average particle diameter of 0.5 μm; $ZrO_2$ powder with which $Y_2O_3$ forms a solid solution; an organic binder; and a solvent. This slurry was then applied on the electrically conductive supporting substrate compact by a screen-printing method and then dried to form a coating layer for the fuel electrode layer. Next, a 30 μm-thick solid electrolyte layer sheet was produced by a doctor blade method with a slurry obtained by mixing an organic binder, a solvent, and $ZrO_2$ powder (a solid electrolyte layer raw material powder) having a particle diameter of 0.8 μm according to a micro-track method, with which 8 mol % of yttria ($Y_2O_3$) forms a solid solution. This solid electrolyte layer sheet was bonded to the coating layer for the fuel electrode layer and then dried to produce a layered compact.

Next, the $CeO_2$ was pulverized with a vibration mill or a ball mill using isopropyl alcohol (IPA) as a solvent to obtain a raw material powder for a first layer compact. A composite oxide containing 85 mol % of $CeO_2$ and 15 mol % of an oxide of another rare earth element ($GdO_{1.5}$) was pulverized with a vibration mill or a ball mill using isopropyl alcohol (IPA) as a solvent, a calcination treatment was performed for four hours at 900° C., a pulverizing treatment was performed again with the ball mill, and the degree of aggregation was adjusted to obtain a raw material powder for the first layer compact.

Next, an acrylic binder and toluene were added to the raw material powder for each first layer compact and then mixed to produce a slurry for a first layer. This slurry was applied on the solid electrolyte layer calcinated body of the obtained layered calcinated body or the solid electrolyte layer compact of the layered compact by a screen-printing method to produce the first layer compact.

Next, the first layer compact was fired for 3 hours at 1500° C. in the atmosphere.

Next, a composite oxide containing 90 mol % of $CeO_2$ and 10 mol % of an oxide of another rare earth element ($GdO_{1.5}$) was pulverized with a vibration mill or a ball mill using isopropyl alcohol (IPA) as a solvent, a calcination treatment was performed for four hours at 900° C., a pulverizing treatment was performed again with the ball mill, and the degree of aggregation was adjusted to obtain a raw material powder for a second layer compact. An acrylic binder and toluene were added to the raw material powder for the second layer compact and then mixed to produce a slurry for a second layer, and the slurry for the second layer was applied, by a screen-printing method, to the surface of the first layer formed by firing to form a second layer compact film. Then, the second layer compact film was fired for 5 hours at 1300° C. to form the intermediate layer including the first layer and the second layer on the surface of the solid electrolyte layer.

Then, a slurry containing an air electrode layer material (e.g., an $LaCoO_3$-based oxide powder) serving as the air electrode layer, a solvent, and a pore-forming agent was applied to the intermediate layer by dipping or the like. In addition, an interconnector was formed on the side opposite to the air electrode layer, a slurry containing a p-type semiconductor layer material (e.g., a $LaCoO_3$-based oxide powder) serving as a p-type semiconductor layer and a solvent was applied to the surface of the interconnector by dipping or the like, and the resultant was fired at 1200° C. for 4 hours to produce a cell.

Example 2

A layered compact was prepared by the same method as that described in Example 1.

Next, a film including Gd serving as the first layer of the intermediate layer was formed in a plurality of layers on the surface of the solid electrolyte layer by the above-mentioned vapor deposition method (IAD method). Specifically, during vacuum deposition, a gas ion ($Ar^+$ ion, $O2^-$ ion) of about several 100 eV is emitted to the substrate by an ion gun, and by the kinetic energy thereof, the film that dendritically grows is destroyed and compressed to form a dense film of the first layer.

Next, a composite oxide containing 90 mol % of $CeO_2$ and 10 mol % of an oxide of another rare earth element (GdO$_{1.5}$) was pulverized with a vibration mill or a ball mill using isopropyl alcohol (IPA) as a solvent, a calcination treatment was performed for four hours at 900° C., a pulverizing treatment was performed again with the ball mill, and the degree of aggregation was adjusted to obtain a raw material powder for the second layer compact. An acrylic binder and toluene were added to the raw material powder for the second layer compact and then mixed to produce the slurry for the second layer, and the slurry for the second layer was applied, by a screen-printing method, to the surface of the first layer formed by vapor deposition to form the second layer compact film. Then, the second layer compact film was fired for 5 hours at 1300° C. to form the intermediate layer including the first layer and the second layer on the surface of the solid electrolyte layer.

Then, the slurry containing the air electrode layer material (e.g., an LaCoO$_3$-based oxide powder) serving as the air electrode layer, a solvent, and a pore-forming agent was applied to the intermediate layer by dipping or the like. In addition, the interconnector was formed on the side opposite to the air electrode layer, the slurry containing the p-type semiconductor layer material (e.g., a LaCoO$_3$-based oxide powder) serving as the p-type semiconductor layer and a solvent was applied to the surface of the interconnector by dipping or the like, and the resultant was fired at 1200° C. for 4 hours to produce a cell.

Example 3

Cells were produced in the same manner as described in Example 1. At this time, cells whose thickness in the first layer are 1/60, 1/50, 1/10, 1/2, and 2/3, respectively, of the total thickness of the intermediate layer were prepared.

Comparative Example

As Comparative Example 1, cells were produced in the same manner as described in Example 1. At this time, a second layer was formed directly on the surface of the solid electrolyte layer without producing the first layer. Other than this point, production was performed as in Example 1.

As Comparative Example 2, cells were produced in the same manner as described in Example 1. At this time, a cell in which the Gd concentration of the first layer is less than that of the second layer was produced, and further, a cell in which the Gd concentrations of the first layer and the second layer are equal to each other was produced. Other than this point, production was performed as in Example 1.

Evaluation Method

Five cells of Example 1 were prepared as samples Nos. 1 to 5, five cells of Example 2 were prepared as samples Nos. 6 to 10, and five cells of Example 3 were prepared as samples Nos. 11 to 15. In addition, two cells of Comparative Example 1 were prepared as samples Nos. 16 and 17. Further, three cells of Comparative Example 2 were prepared as samples Nos. 18 to 20.

In each of cells of samples Nos. 1 to 20, a platinum lead wire was attached to each of the air electrode layer and the p-type semiconductor layer. Thereafter, a predetermined current was passed through the cell via the lead wire, and the generated voltage (cell voltage) was measured.

Next, in each of cells of the samples Nos. 1 to 20, a portion of the intermediate layer provided between the solid electrolyte layer and the air electrode layer was cut to expose a cross-section thereof. The cross sections were photographed like a section SEM photograph illustrated in FIG. 3A, and the rare earth elements Gd were mapped by the EPMA method as illustrated in FIG. 3B for a surface analysis to calculate the Gd concentration by a quantitative analysis based on the EPMA method. In addition, for samples Nos. 11 to 15, the total thickness of the intermediate layer and the thickness of the first layer were measured in the cross section SEM photograph.

The results are shown below.

Table 1 shows the Gd concentration of each of the first layer and the second layer in the intermediate layer. Further, a value obtained by dividing the Gd concentration of the first layer by the Gd concentration of the second layer is shown as the magnification of Gd concentration. In addition, the total thickness of the intermediate layer and the thickness of the first layer are shown. Further, a value obtained by dividing the thickness of the first layer by the total thickness of the intermediate layer is shown as the ratio of the layer thickness.

Table 1 also shows the measurement result of the voltage (cell voltage) of the individual cells for each of the cells of the samples Nos. 1 to 20.

TABLE 1

| | | Sample no. | Gd concentration (mass %) | | Gd concentration magnification | Layer thickness (μm) | | Ratio of layer thickness | Cell Voltage (mV) |
|---|---|---|---|---|---|---|---|---|---|
| | | | First layer | Second layer | | First layer | Total of intermediate layer | | |
| Examples | Example 1 | 1 | 3.09 | 3.0 | 1.03 | — | — | — | 810 |
| | | 2 | 3.15 | 3.0 | 1.05 | — | — | — | 830 |
| | | 3 | 5.0 | 2.5 | 2.0 | — | — | — | 835 |
| | | 4 | 7.5 | 2.5 | 3.0 | — | — | — | 840 |
| | | 5 | 8.0 | 2.5 | 3.2 | — | — | — | 815 |
| | Example 2 | 6 | 3.06 | 3.0 | 1.02 | — | — | — | 812 |
| | | 7 | 3.15 | 3.0 | 1.05 | — | — | — | 833 |
| | | 8 | 6.25 | 2.5 | 2.5 | — | — | — | 837 |
| | | 9 | 7.5 | 2.5 | 3.0 | — | — | — | 843 |
| | | 10 | 7.75 | 2.5 | 3.1 | — | — | — | 818 |
| | Example 3 | 11 | 3.09 | 3.0 | 1.03 | 0.05 | 3.0 | 1/60 | 805 |
| | | 12 | 3.15 | 3.0 | 1.05 | 0.06 | 3.0 | 1/50 | 830 |
| | | 13 | 5.0 | 2.5 | 2.0 | 0.4 | 4.0 | 1/10 | 835 |
| | | 14 | 7.5 | 2.5 | 3.0 | 2.5 | 5.0 | 1/2 | 840 |
| | | 15 | 8.0 | 2.5 | 3.2 | 7.5 | 5.0 | 2/3 | 813 |

TABLE 1-continued

| | | Sample no. | Gd concentration (mass %) | | Gd concentration magnification | Layer thickness (μm) | | | Cell Voltage (mV) |
|---|---|---|---|---|---|---|---|---|---|
| | | | First layer | Second layer | | First layer | Total of intermediate layer | Ratio of layer thickness | |
| Comparative Examples | Comparative Example 1 | 16 | — | 3.0 | — | — | — | — | 778 |
| | | 17 | — | 2.5 | — | — | — | — | 780 |
| | Comparative Example 2 | 18 | 1.5 | 3.0 | 0.5 | — | — | — | 783 |
| | | 19 | 2.0 | 2.5 | 0.8 | — | — | — | 790 |
| | | 20 | 2.5 | 2.5 | 1.0 | — | — | — | 794 |

The results of Table 1 are described below.

It was confirmed that, in comparison with the samples Nos. 16 and 17 of Comparative Example 1 having no first layer, the samples Nos. 18 and 19 of Comparative Example 2 having the first layer having a lower Gd concentration than that of the second layer closer to the solid electrolyte, and the sample No. 20 of Comparative Example 2 in which the Gd concentrations in the first layer and the second layer are the same, the samples Nos. 1 to 15 of Examples having a first layer closer to the solid electrolyte side with a greater Gd concentration than that of the second layer have cell voltages of 800 mV or greater, and power generation performance was improved in the samples Nos. 1 to 15 of Examples.

Also, in the samples Nos. 2 to 4, samples Nos. 7 to 9, and samples Nos. 12 to 14 of Example, the Gd concentration of the first layer is 1.05 to 3 times the Gd concentration of the second layer. Also, in the samples Nos. 1, 6 and 11, the Gd concentration of the first layer is less than 1.05 times the Gd concentration of the second layer. Also, in the samples Nos. 5, 10 and 15, the Gd concentration of the first layer is greater than three times the Gd concentration of the second layer. From the results on the cell voltage in Table 1, it was confirmed that the cell voltage was as high as 830 mV or greater and the power generation performance was improved in the samples Nos. 2 to 4, 7 to 9, and 12 to 14 in comparison with the samples Nos. 1, 6 and 11 and the samples Nos. 5, 10 and 15.

In addition, in Examples, the thickness of the first layer is 1/50 or greater and 1/2 or less of the total thickness of the intermediate layer in samples Nos. 12 to 14. In addition, the thickness of the first layer is less than 1/50 of the total thickness of the intermediate layer in the sample No. 11. In addition, the thickness of the first layer is greater than 1/2 of the total thickness of the intermediate layer in the sample No. 15. From the results on the cell voltage in Table 1, it was confirmed that the cell voltage is as high as 830 mV or greater and the power generation performance is improved in the samples Nos. 12 to 14 in comparison with the samples Nos. 11 and 15.

REFERENCE SIGNS LIST

1 First electrode layer (air electrode layer)
4 Intermediate layer
4a First layer
4b Second layer
7 Second electrode layer (fuel electrode layer)
9 Solid electrolyte layer
10 Cell
11 Module
15 Cell stack device
19 Module housing device

What is claimed is:

1. A cell comprising:
an intermediate layer comprising a solid solution, the solid solution composed of particles comprising $CeO_2$ and a second rare earth element oxide comprising a second rare earth element that is different from Ce;
a first electrode layer, the intermediate layer and then the first electrode layer being disposed in this order on a surface of one side of a solid electrolyte layer containing Zr; and
a second electrode layer disposed on a surface on another side opposite the surface of the one side of the solid electrolyte layer,
wherein
the intermediate layer structurally comprises a first layer and a second layer, the first layer located closer to the solid electrolyte layer than the second layer and the second layer disposed on the first layer and located closer to the first electrode layer than the first layer,
a concentration of the second rare earth element in the first layer is greater than a concentration of the second rare earth element in the second layer, and
the first layer comprises a particle of the particles of the solid solution that is a flat particle whose length in a direction orthogonal to a thickness direction of the intermediate layer is greater than a length of the flat particle in the thickness direction of the intermediate layer.

2. The cell according to claim 1, wherein the first layer is denser than the second layer.

3. The cell according to claim 1, wherein the concentration of the second rare earth element of the first layer is from 1.05 times to 3 times a concentration of the second rare earth element of the second layer.

4. The cell according to claim 1, wherein a thickness of the first layer is not less than 1/50 and not greater than 1/2 of a total thickness of the intermediate layer.

5. A cell stack device comprising:
a plurality of cells according to claim 1,
wherein the plurality of cells are electrically connected with each other.

6. A module comprising the cell stack device according to claim 5, wherein the cell stack device is contained in a housing.

7. A module housing device comprising:
the module according to claim 6; and
an auxiliary device configured to operate the module, wherein the module and the auxiliary device are contained in an external casing.

8. The cell according to claim 1, wherein the concentration of the second rare earth element of the first layer is in a range of 3 mass % to 8 mass %.

9. The cell according to claim 1, wherein the second rare earth element is selected from the list of rare earth elements consisting of: Sm, Y, Yb, Gd, and combinations thereof.

10. The cell according to claim 1, wherein the solid solution further comprises a third rare earth element oxide comprising a third rare earth element different from both Ce and the second rare earth element.

11. The cell according to claim 1, wherein a plurality of the flat particles constitute 70% or more of the particles of the solid solution in the first layer.

12. The cell according to claim 1, wherein the flat particle has an aspect ratio between 1.2 and 5.

13. A cell comprising:
an intermediate layer comprising a solid solution, the solid solution comprising $CeO_2$ and a second rare earth element oxide comprising a second rare earth element selected from the list of rare earth elements consisting of: Sm, Y, Yb, Gd, and combinations thereof;
a first electrode layer, the intermediate layer and then the first electrode layer being disposed in this order on a surface of one side of a solid electrolyte layer containing Zr; and
a second electrode layer disposed on a surface on another side opposite the surface of the one side of the solid electrolyte layer,
wherein
the intermediate layer structurally comprises a first layer and a second layer, the first layer located closer to the solid electrolyte layer than the second layer and the second layer disposed on the first layer and located closer to the first electrode layer than the first layer,
a concentration of the second rare earth element in the first layer is greater than a concentration of the second rare earth element in the second layer, and
the concentration of the second rare earth element of the first layer is in a range of 3 mass % to 8 mass %.

14. The cell according to claim 13, wherein the solid solution further comprises a third rare earth element oxide comprising a third rare earth element selected from the list of rare earth elements consisting of: Sm, Y, Yb, Gd, and combinations thereof, with the third rare earth element different from both Ce and the second rare earth element.

15. The cell according to claim 13, wherein the first layer is denser than the second layer.

16. The cell according to claim 13, wherein the concentration of the second rare earth element of the first layer is from 1.05 times to 3 times a concentration of the second rare earth element of the second layer.

17. The cell according to claim 13, wherein a thickness of the first layer is not less than 1/50 and not greater than 1/2 of a total thickness of the intermediate layer.

18. The cell according to claim 13, wherein the first layer comprises a particle of the solid solution that is a flat particle whose length in a direction orthogonal to a thickness direction of the intermediate layer is larger than a length of the flat particle in the thickness direction of the intermediate layer.

19. A cell comprising:
an intermediate layer comprising a solid solution, the solid solution comprising $CeO_2$ and second rare earth element oxide comprising a second rare earth element that is different from Ce;
a first electrode layer, the intermediate layer and then the first electrode layer being disposed in this order on a surface of one side of a solid electrolyte layer containing Zr; and
a second electrode layer disposed on a surface on another side opposite the surface of the one side of the solid electrolyte layer,
wherein
the intermediate layer structurally comprises a first layer and a second layer, the first layer located closer to the solid electrolyte layer than the second layer and the second layer disposed on the first layer and located closer to the first electrode layer than the first layer,
a concentration of the second rare earth element in the first layer is greater than a concentration of the second rare earth element in the second layer, and
the concentration of the second rare earth element of the first layer is in a range of 3 mass % to 8 mass %.

* * * * *